United States Patent
Kioka et al.

[11] Patent Number: 6,121,393
[45] Date of Patent: *Sep. 19, 2000

[54] PROCESS FOR POLYMERIZING ALPHA-OLEFINS

[75] Inventors: Mamoru Kioka; Norio Kashiwa, both of Iwakuni; Tomohiko Kimura, Ichihara; Mitsuo Tomura, Chiba; Toshiki Sotoyama, Ichihara, all of Japan

[73] Assignee: Mitsui Chemicals, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/418,879

[22] Filed: Apr. 7, 1995

Related U.S. Application Data

[63] Continuation of application No. 08/090,642, Jul. 13, 1993, abandoned, which is a continuation of application No. 07/715,850, Jun. 17, 1991, abandoned, which is a continuation of application No. 07/280,722, Oct. 12, 1988, abandoned.

[30] Foreign Application Priority Data

| Feb. 17, 1987 | [JP] | Japan | 62-32507 |
|---|---|---|---|
| Feb. 17, 1987 | [JP] | Japan | 62-32508 |
| Feb. 19, 1987 | [JP] | Japan | 62-34605 |
| Feb. 19, 1987 | [JP] | Japan | 62-34606 |

[51] Int. Cl.[7] ..................... C08F 2/18
[52] U.S. Cl. ............ 526/124.3; 526/114; 526/116; 526/119; 526/124.2; 526/125.1; 526/125.7; 526/357
[58] Field of Search ............... 526/125, 124.2, 526/125.2, 125.7, 125.3, 114, 116, 119, 125.1, 124.3, 351

[56] References Cited

U.S. PATENT DOCUMENTS

| 4,304,891 | 12/1981 | Sato et al. | 526/904 |
|---|---|---|---|
| 4,329,255 | 5/1982 | Beach et al. | 526/119 |
| 4,394,291 | 7/1983 | Hawley . | |
| 4,419,269 | 12/1983 | Schell | 526/125 |
| 4,537,870 | 8/1985 | Hawley . | |
| 4,579,836 | 4/1986 | Arzoumanidis et al. | 526/904 |
| 4,640,906 | 2/1987 | Terano et al. . | |
| 4,659,792 | 4/1987 | Kashiwon et al. | 526/128 |
| 4,686,200 | 8/1987 | Terano et al. . | |
| 4,724,255 | 2/1988 | Lofgren et al. | 524/128 |
| 4,774,300 | 9/1988 | Agapiou et al. | 526/125 |
| 4,798,866 | 1/1989 | Yoshitaka et al. | 526/904 |
| 4,861,846 | 8/1989 | Cann et al. | 526/119 |
| 4,952,649 | 8/1990 | Kioka et al. | 526/904 |
| 4,981,928 | 1/1991 | Agapiou | 526/116 |

FOREIGN PATENT DOCUMENTS

| 0086288A | 8/1983 | European Pat. Off. . | |
|---|---|---|---|
| 56-104907 | 8/1981 | Japan . | |
| 59-206407 | 11/1984 | Japan . | |
| 59-213706 | 12/1984 | Japan . | |
| 60-181106 | 9/1985 | Japan . | |
| 62-115004 | 5/1987 | Japan | 526/904 |
| 2024832 | 1/1980 | United Kingdom | 526/904 |

OTHER PUBLICATIONS

Translation of Mitsui (907).

*Primary Examiner*—David W. Wu
*Assistant Examiner*—Ling-Siu Choi

[57] ABSTRACT

A process for polymerizing an alpha-olefin using either a catalyst formed by contacting a highly active solid titanium catalyst component, an organo-metallic compound of a metal of Group 1 to 3 of the periodic table, an organic halogen compound or a transition metal compound, and an organosilicon compound or a sterically hindered amine in an inert medium in the absence of an alpha olefin, or a catalyst prepared by preliminarily polymerizing an alpha olefin in the presence of a catalyst comprising the above four catalyst components, provided that the last one is an optional component. This process achieves the industrially advantage that the catalysts are highly active, and give a polymer having excellent stereoregularity.

13 Claims, No Drawings

PROCESS FOR POLYMERIZING ALPHA-OLEFINS

CROSS REFERENCE TO RELATED APPLICATIONS

The present application is a continuation of applicants' prior application Ser. No. 08/090,642 filed Jul. 13, 1993, now abandoned, which is a continuation of application Ser. No. 07/715,850 filed Jun. 17, 1991, now abandoned, which is a continuation of application Ser. No. 07/280,722 filed Oct. 12, 1988, now abandoned, which is a 371 of PCT/JP88/00153 filed Feb. 16, 1998, to which applicants claim priority.

TECHNOLOGICAL FIELD

This invention relates to a process for polymerizing alpha-olefins, and particularly, to a process which can produce poly-alpha-olefins having excellent stereoregularity with high catalytic activity.

BACKGROUND TECHNOLOGY

Processes are known for producing crystalline polyolefins by polymerizing alpha-olefins such as propylene and 1-butene in the presence of stereoregular catalysts. It is known that among these processes, processes for polymerizing alpha-olefins in the presence of a catalyst formed from (a) a highly active titanium solid catalyst component consisting essentially of magnesium, titanium, halogen and an electron donor, (b) an organometallic compound catalyst component and (c) an electron donor catalyst component give highly stereoregular polymers with high catalytic activity. These processes are employed on an industrial scale as excellent polymerization processes which do not require removal of the catalyst and an amorphous polymer from the polymers obtained after the polymerization. It has been desired in the art however to develop a better polymerization technique.

The present applicant proposed in Japanese Patent Publication No. 31726/1982 a process for polymerizing an alpha-olefin in the presence of a titanium catalyst component obtained by treating a complex of a magnesium halide compound and a titanium halide compound with an organic acid ester and a titanium compound, and an organometallic compound of a metal of Groups 1 to 3 of the periodic table.

Japanese Patent Publication No. 45403/1981 also proposed by the present applicant a process for polymerizing merizing an olefin in the presence of a catalyst composed of (A) a solid catalyst component obtained by reacting a titanium compound and an organic metal compound of a metal of Groups 1 to 3 of the periodic table in the presence of a complex of a magnesium halide compound and a titanium halide compound and (B) an organometallic compound of a metal of Groups 1 to 3 of the periodic table.

But a polymerization process which gives higher polymerization activity and stereoregularity than these processes has been sought.

It is an object of this invention to provide a process for polymerizing an alpha-olefin using a novel highly active catalyst.

Another object of this invention is to provide a process for polymerizing an alpha-olfein using a novel highly active catalyst of which activity is higher than in processes using conventional catalysts comprising (a) a highly active titanium solid catalyst component consisting essentially of magnesium, titanium, halogen and an electron donor, (b) an organometallic compound catalyst component and (c) an electron donor catalyst component and which can retain the excellent stereoregularity of the resulting polymer.

Further objects of this invention along with its advantages will become apparent from the following description.

DISCLOSURE OF THE INVENTION

According to this invention, these objects and advantages of the invention are firstly achieved by a process for polymerizing an alpha-olefin, which comprises contacting (A) a highly active solid titanium catalyst component comprising magnesium, titanium and halogen atoms and an electron donor, (B) an organometallic compound catalyst component of a metal of Groups 1 to 3 of the periodic table, (C) a catalyst component selected from organic halogen compounds and transition metal compounds soluble in an inert medium, and (D) a catalyst component selected from organo-silicon compounds and sterically hindered amines in an inert medium in the absence of an alpha-olefin to form a catalyst, and polymerizing an alpha-olefin in the presence of the catalyst.

The term "polymerization" in this invention is sometimes used to mean not only homopolymerization but also copolymerization, and the term "polymer" is sometimes used to mean both a homopolymer and a copolymer.

The titanium catalyst component (A) used in this invention is a highly active catalyst component composed of magnesium, tianium and halogen atoms and an electron donor as essential ingredients. The titanium catalyst component (A) contains magnesium halide generally with smaller crystallites than commercial magnesium halides. Usually, it has a specific surface area of at least about 3 $m^2/g$, preferably about 40 to about 1000 $m^2/g$, more preferably about 80 to about 800 $m^2/g$. Usually, its composition does not substantially change even when it is washed with hexane at room temperature. Preferably, in the titanium catalyst component (A), the halogen/titanium atomic ratio is from about 5 to about 200, especially from about 5 to about 100, the electron donor/titanium mole ratio to be described is from about 0.1 to about 10, especially from about 0.2 to about 6, and the magnesium/titanium atomic ratio is from about 2 to about 100, especially from about 4 to about 50. The component (A) may further contain another electron donor, a metal, an element, and a functional group. It may also contain an inorganic or organic diluent such as a silicon compound, aluminum or a polyolefin.

The titanium catalyst component (A) may be obtained, for example, by contacting a magnesium compound (or magnesium metal), the electron donor and a titanium compound with one another. If desired, another reaction reagent such as a compound of silicon, phosphorus or aluminum may be used at the time of mutual contacting.

The production of the titanium catalyst component (A) may be effected in accordance with methods disclosed, for example, in Japanese Laid-Open Patent Publications Nos. 108,385/1975 (corresponding to U.S. Pat. No. 415,743), 126,590/1975, 20,297/1976 (corresponding to U.S. Pat. No. 4,157,435), 28,189/1976 (corresponding to U.S. Pat. No. 4,407,924), 64,586/1976, 92,885/1976 (corresponding to U.S. Pat. No. 4,085,276), 136,625/1976, 87,489/1976 (corresponding to U.S. Pat. No. 4,020,012), 100,596/1977, 147,688/1977 (corresponding to U.S. Pat. No. 4,232,139), 104,593/1977 (corresponding to U.S. Pat. No. 4,143,223), 2,580/1978 (corresponding to British Patent No. 1554340), 40,093/1978 (corresponding to U.S. Pat. No. 4,490,513), 43,094/1978, 135,102/1980 (corresponding to U.S. Pat. No. 4,315,874), 135,103/1981, 811/1981 (corresponding to U.S. Pat. No. 4,330,649), 11,908/1981 (corresponding to European Patent No. 22675), 18,606/1981 (corresponding to U.S. Pat. No. 4,335,015), 83,006/1983 (corresponding to British Patent No. 21111066), 138,705/1983 (corresponding to European Patent 86645), 138,706/1983 (corresponding to European Patent 86644), 138,707/1983, 138,708/1983, 138,709/1983, 138,710/1983, 138,715/1983, 23,404/1985 (corresponding to U.S. Pat. No. 4,547,476), 21,109/1986, 37,802/1986, 37,803/1986 (corresponding to U.S. Pat. No. 4,647,550), and 152,710/1980 (corresponding to U.S. Pat. No. 4,393,182). Several examples of the method of producing the titanium catalyst compound (A) will be briefly described below.

(1) A magnesium compound or both a magnesium compound/electron donor complex compound, with or without pulverization in the presence or absence of an electron donor and a pulverization aid, is, after optionally treated preliminarily with a reaction aid such as an electron donor and/or an organoaluminum compound or a halogen-containing silicon compound, reacted with a titanium compound which is in the liquid phase under the reaction conditions. The electron donor is used at least once.

(2) A liquid form of a magnesium compound having no reducing ability is reacted with a liquid titanium compound in the presence of an electron donor to precipitate a solid titanium complex.

(3) The solid titanium complex obtained by method (2) is reacted with a titanium compound.

(4) The product of (1) or (2) is reacted with an electron donor and a titanium compound.

(5) A magnesium compound or a magnesium compound/electron donor complex compound is pulverized in the presence of a titanium compound and in the presence or absence of an electron donor and a pulverizing aid. The product, with or without preliminary treatment with a reaction aid such as an electron donor and/or an organo-aluminum compound or a halogen-containing silicon compound, is treated with a halogen atom, a halogen compound or an aromatic hydrocarbon. The electron donor is used at least once.

(6) The compound obtained in any of the method (1) to (4) is treated with a halogen atom, a halogen compound or an aromatic hydocarbon.

Among these production methods, those in which a liquid titanium halide is used, or a halogenated hydrocarbon is used after or during the use of the titanium compound are preferred.

The electron donor that can be the constituent of the highly active titanium catalyst component (A) in this invention may be, for example, an oxygen-containing electron donor such as an alcohol, a phenol, a ketone, an aldehyde, a carboxylic acid, an organic or inorganic acid ester, an ether, an acid amide or an acid anhydride, or a nitrogen-containing electron donor such as ammonia, an amine, a nitrile or an isocyanate.

Specific examples include alcohols having 1 to 18 carbon atoms such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol; phenols having 6 to 25 carbon atoms which may contain an alkyl group, such as phenol, cresol, xylenol, ethylphenol, propylphenol, cumylphenol, nonylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms including esters to be described below which are desirably included in the titanium catalyst component, such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gamma-butyrolactone, delta-valerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to 15 carbon atoms such as acetyl chloride, benzoyl chloride, tolyl chloride, anisoyl chloride and phthaloyl dichloride; ethers having 2 to 20 carbon atoms such as methyl ether, ethyl ether, isopropyl ether, butyl ether, amyl ether, tetrahydrofuran, anisole and diphenyl ether; acid amides such as an acetamide, benzamide and toluamide; acid anhydrides such as benzoic anhydride and phthalic anhydride; amines such as methylamine, ethylamine, diethylamine, tributylamine, piperidine, tribenzylamine, aniline, pyrldine, picoline and tetramethyl ethylenediamine; and nitriles such as acetonitrile, benzonitrile and tolunitrile. These electron donors may be used as a combination of two or more.

Electron donors desirably included in the titnaium catalyst component are esters. More preferred are compounds having a skeleton represented by the following formula

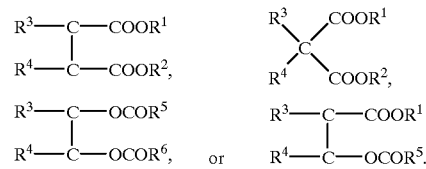

In the formulae, $R^1$ is a substituted or unsubstituted hydrocarbon group; $R^2$, $R^5$ and $R^6$ are hydrogen or a substituted or unsubstituted hydrocarbon group; $R^3$ and $R^4$ are hydrogen or a substituted or unsubstituted hydrocarbon group (preferably at least one of $R^3$ and $R^4$ is the hydrocarbon group); and $R^3$ and $R^4$ may be linked to each other. The substituted hydrocarbon groups for $R^1$ to $R^6$ are groups containing a hetero atom such as N, O or S, for example C—O—C, COOR, COOH, OH, $SO_3H$, —C—N—C— or $NH_2$.

Diesters of dicarboxylic acids in which at least one of $R^1$ and $R^2$ is an alkyl group having at least 2 carbon atoms are especially preferred.

Specific examples of preferred polycarboxylic acid esters include aliphatic polycarboxylic acid esters such as dithyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl methylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, ethyl tetrahydrophthalate and Nadic acid diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethylisobutyl phthalate, ethylnbutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl glutarate, benzylbutyl phthalate, diphenyl phthalate, diethyl naphthalenedicarboxylate, dibutyl naphthalenedicarboxylate, triethyl trimellitate and dibutyl trimellitate; and heterocylclic polycarboxylic acid esters such as 3,4-furanedicarboxylic acid.

Specific examples of preferred polyhydroxy compound esters are 1,2-diacetoxybenzene, 1-methyl-2,3-diacetoxybenzene, 2,3-diacetoxynaphthalene, ethylene glycol dipivalate and butanediol pivalate.

Examples of hydroxy-substituted carboxylic acid esters are benzoylethyl salicylate, acetylisobutyl salicylate and acetylmethyl salicylate.

Examples of polycarboxylic acid esters that can be supported on the titanium catalyst component include long-chain dicarboxylic acid esters such as diethyl adipate, diisobutyl adipate, diisopropyl sebacate, di-n-butyl sebacate, di-n-octyl sebacate and di-2-ethylhexyl sebacate.

Preferred among these polyfunctional esters are those having the skeletons of the above general formulae. More preferred are esters of phthalic acid, maleic acid or substituted malonic acid with alcohols having 2 or more carbon atoms. Especially preferred are diesters of phthalic acid with alcohols having 2 or more carbon atoms.

Other examples of electron donors to be supported on the titanium catalyst component are monocarboxylic acid esters of the formula RCOOR' in which R and R' represent a hydrocarbyl group which may contains a substituent, and at least one of R and R' is a branched chain (including alicyclic) or ring-containing chain group. For example, R and/or R' may be $(CH_3)_2CH-$, $C_2H_5CH(CH_3)-$, $(CH_3)_2CHCH_2-$, $(CH_3)_3C-$, $C_2H_5CH(CH_3)CH_2-$,

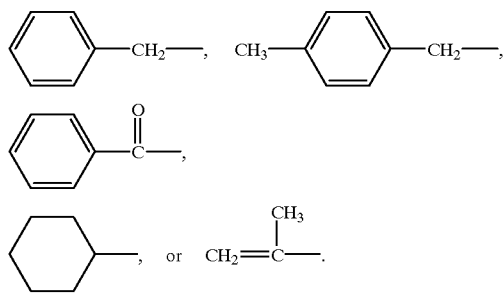

If at least one of R and R' is one of the above-indicated groups, the other may be the above group or another group such as a linear or cyclic group.

Specific examples include monoesters of dimethylacetic acid, trimethylacetic acid, alpha-methylbutyric acid, beta-methylbutyric acid, methacrylic acid or benzoylacetic acid, and various monocarboxylic acid esters with alcohols such as isopropanol, isobutylalcohol and tert-butyl alcohol.

Carbonate esters may be selected as the electron donor. Specific examples are diethyl carbonate, ethylene carbonate, diisopropyl carbonate, phenylethyl carbonate and diphenyl carbonate.

In depositing these electron donors, it is not always necessary to use these compounds as starting materials. It is possible to use compounds capable of being converted into these in the course of preparing the titanium catalyst component, and convert them into the above compounds in the step of preparing the catalyst.

Another electron donor may be caused to be present together in the titanium catalyst component. But since the presence of it in too large an amount exerts adverse effects, its amount should be limited to a small one.

The magnesium compounds used in the preparation of the solid titanium catalyst component (A) may or may not have reducing ability. Examples of the former are magnesium compounds having a magnesium-carbon bond or a magnesium-hydrogen bond, such as dimethyl magnesium, diethyl magnesium, dipropyl magnesium, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butyl ethoxy magnesium, ethyl butyl magnesium and butyl magnesium hydride. These magnesium compounds may be used in the form of complexes with organoaluminum compounds. They may be in the form of a solution or a solid. Examples of the magnesium compounds having no reducing ability include magnesium halides such as magnesium chloride, magnesium bromide, magnesium iodide and magnesium fluoride; alkoxy magnesium halides such as methoxy magnesium chloride, ethoxy magnesium chloride, isopropoyl magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and magnesium carboxylates such as magnesium laurate and magnesium stearate. These magnesium compounds having no reducing ability may be derived from the above magnesium compounds having reducing ability, or may be derived during the preparation of the catalyst component. For example, by contacting the magnesium compounds having reducing ability with such compounds as polysiloxane compounds, halogen-containing silane compounds, halogen-containing aluminum compounds, esters and alcohols, they can be converted into magnesium compounds having no reducing ability. These magnesium compounds may be complex compounds with other metals, or mixtures with other metal compounds, or mixtures of two or more of these compounds. The magnesium compounds having no reducing ability are preferred. Especially preferred are halogen-containing magnesium compounds, above all magnesium chloride, alkoxy magnesium chlorides and aryloxy magnesium chlorides.

Various titanium compounds are used in the preparation of the solid titanium catalyst component (A) used in this invention. Usually, tetravalent titanium compounds represented by $Ti(OR)_g X_{4-g}$ where R represents a hydrocarbon group, X represents halogen, and $0 \leq g \leq 4$ are preferred. Specific examples include titanium tetrahalides such as TiCl$_4$, TiBr$_4$ and TiI$_4$; alkoxy titanium trihalides such as Ti(OCH$_3$)Cl$_3$, Ti(OC$_2$H$_5$)Cl$_3$, Ti(O n-C$_4$H$_9$)Cl$_3$, Ti(OC$_2$H$_5$)Br$_3$ and Ti(O iso-C$_4$H$_9$)Br$_3$; alkoxy titanium dihalides such as Ti(OCH$_3$)$_2$Cl$_2$, Ti(OC$_2$H$_5$)$_2$Cl$_2$, Ti(O n-C$_4$H$_9$)$_2$Cl$_2$ and Ti(OC$_2$H$_5$)$_2$Br$_2$; trialkoxy titanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_4$ and Ti(O n-C$_4$H$_9$)$_4$. Of these, the halogen-containing titanium compounds are preferred, and the titanium tetrahalides are more preferred. Titanium tetrachloride is especially preferred. These titanium compounds may be used singly or as a mixture, or as diluted with a hydrocarbon or a halogenated hydrocarbon.

The amounts of the titanium compound, the magnesium compounds and the electron donor to be supported and an electron donor which may be used as required, such as alcohols, phenols, monocarboxylic acid esters, silicon compounds and aluminum compounds in the preparation of the titanium catalyst component (A) differ depending upon the method of preparation, and cannot be generally determined. For example, the amounts may be such that per mole of the magnesium compound, about 0.05 to 5 moles of the electron donor to be supported and about 0.05 to 500 moles of the titanium compound are used.

The halogen atom constituting the titanium catalyst component may be, for example, fluorine, chlorine, bromine, iodine, or a mixture thereof. Chlorine is especially preferred.

In the present invention, olefins are polymerizing merized or copolymerized by using a catalyst composed of a combination of the titanium solid catalyst component (A), the group 1–3 metal organometallic compound catalyst component (B) (e.g., an organoaluminum compound) and the components (C) and (D) to be described.

Examples of the group 1–3 metal organometalic compound catalyst component (B) include (i) organoaluminum compounds having one Alcarbon bond at least in the molecule, for example organoaluminum compounds of the general formula

R$_m^1$Al(OR$^2$)$_n$H$_p$X$_q$ wherein R$^1$ and R$^2$ may be identical or different, and each represents a hydrocarbon group usually having 1 to 15 carbon atoms, preferably 1 to 4 carbon atoms, X represents Halogen, 0<m≦3, 0≦n<3, 0≦p<3, 0≦q<3, and m+n+p+q=3, (ii) complex alkylated products of a Group 1 metal and aluminum represented by the general formula

M$^1$AlR$_4^1$ wherein M$^1$ represents Li, Na or K, and R$^1$ is as defined above, and (iii) dialkyl compounds of Group 2 metals represented by the general formula

R$^1$R$^2$M$^2$ wherein R$^1$ and R$^2$ are as defined, and M$^2$ represents Mg, Zn or Cd.

Examples of the organoaluminum compounds belonging to (i) above include compounds of the general formula

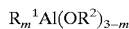
R$_m^1$Al(OR$^2$)$_{3-m}$ wherein R$^1$ and R$^2$ are as defined above, and m is preferably a number represented by 1.5≦m<3, compounds of the general formula

R$^1$AlX$_{3-m}$ wherein R$^1$ is as defined above, X represents halogen, and m is preferably a number represented by 0<m<3, compounds of the general formula

R$^1$AlH$_{3-m}$ wherein R$^1$ is as defined above, and m is preferably 2≦m<3, and compounds of the general formula

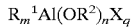
R$_m^1$Al(OR$^2$)$_n$X$_q$ wherein R$^1$ and R$^2$ are as defined above, X represents halogen, 0<m≦3, 0≦n<3, 0≦q<3, and m+n+q=3.

Specific examples of the aluminum compounds belonging to (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition of the formula R$_{2.5}^1$Al(OR$^2$)$_{0.5}$; partially halogenated alkyl aluminums, for example, dialkyl aluminum halogenides such as diethyl aluminum chloride, diethyl aluminum chloride and diethyl aluminum bromide, alkyl aluminum sesquihalogenides such as ethyl aluminum sesquichloride, butyl aluminum sesquichloride and ethyl aluminum sesquibromide, and alkyl aluminum dihalogenides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, and alkyl aluminum dihydrides such as ethyl aluminum dihydride and propylaluminum dihydride; and partially alkoxylated and halogenated alkyl aluminums such as ethyl aluminum ethoxychloride, butyl aluminum butoxychloride and ethyl aluminum ethoxybromide.

Examples of the compounds belonging to (ii) above are LiAl(C$_2$H$_5$)$_4$ and LiAl(C$_7$H$_{15}$)$_4$. Examples of the compounds belonging to (iii) above are diethylzinc and diethylmagnesium. Alkyl magnesium halides such as ethyl magnesium chloride may also be used. Of these, trialkyl aluminums, alkyl aluminum halides and mixtures of these are especially preferred.

The organic halogen compound catalyst component (C) that can be used in this invention may be, for example, an organic halogen compound composed of a hydrocarbon group having 1 to 20 carbon atoms and a halogen atom such as chlorine, bromine, iodine or fluorine.

Specific examples include alkyl halides such as methyl chloride, methyl bromide, methyl iodide, ethyl chloride, ethyl bromide, ethyl iodide, propyl fluoride, isopropyl fluoride, n-propyl chloride, isopropyl chloride, n-propyl bromide, isopropyl bromide, isopropyl iodide, n-butyl chloride, sec-tutyl chloride, isobutyl chloride, tert-butyl chloride, tert-butylbromide, tertbutyl iodide, n-amyl chloride, active amyl chloride, isoamyl chloride, tert-amyl chloride, neopentyl chloride, isoamyl bromide, tert-amyl bromide, n-hexyl chloride, hexyl bromide, heptyl chloride, octyl chloride and decyl chloride; unsaturated monohalogen derivatives such as vinyl chloride, vinyl bromide, vinyl iodide, 1-propenyl chloride, isopropenyl chloride and isopropenyl bromide; saturated dihalogen derivatives such as methylene chloride, methylene bromide, methylene iodide, ethylidene chloride, ethylene chloride, propylidene dichloride, propylene dichloride, isopropylidene dichloride, isopropylidene dibromide, 1,2-dichlorobutane, 1,3-dichlorobutane, pentamethylene dichloride and hexamethylene dichloride; unsaturated dihalogen derivatives such as vinylidene dichloride and 1,2-dichloroethylene; and polyhalogen derivatives such as chloroform, trichloropropane and carbon tetrachloride. Of these organic halogen compounds, the chlorides are preferred, and chlorides containing a branched chain hydrocarbon group are especially preferred.

The transition metal compound soluble in an inert organic medium as the transition metal compound catalyst component (C) may be, for example, a compound of a metal of Group IVB of the periodic table such as titanium, zirconium or hafnium, or an inert medium-soluble compound of such a metal as vanadium or chromium, for example, halide such as a chloride, bromide or iodide, or an alkoxide such as methoxide, ethoxide or propoxide, of the metal. Specifically, tetravalent titanium compounds of the formula $Ti(OR)_g X_{4-g}$ where R is a hydrocarbon group, X is halogen and $0 \leq g \leq 4$ are usually preferred as the transition metal compound. Specific examples include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$; alkoxy titanium dihalides such as $Ti(OCH_3)_2Cl_2$, $Ti(OC_2H_5)_2Cl_2$, $Ti(O\ n\text{-}C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; tetraalkoxytitaniums such as $Ti(OCH_3)_4$, $Ti(OC_2H_5)_4$ and $Ti(O\ n\text{-}C_4H_9)_4$; and mixtures of these compounds with other metal compounds such as aluminum compounds or silicon compounds. Of these, the halogen-containing titanium compounds are preferred, and the titanium tetrahalides are more preferred. Titanium tetrachloride is especially preferred.

$VOCl_3$, $VCl_4$, $VO(OCH_3)Cl_2$, $VO(OC_2H_5)Cl_2$, $VO(OC_2H_5)_{1.5}Cl_{1.5}$, $VO(OCH_3)_2Cl$ and $VO(OC_2H_5)_3$, for example, are preferably used as the vanadium compound which is the transition metal compound catalyst component.

The organosilicon compounds as the catalyst component (D) used in this invention are generally compounds having an Si—O—C or Si—N—C bond, such as alkoxysilanes or aryloxysilanes. Examples of these compounds are silicon compounds represented by the formula $R_n Si(OR^1)_{4-n}$ where $0 \leq n \leq 3$, R represents a hydrocarbon group such as an alkyl, cycloalkyl, aryl, alkenyl, haloalkyl or aminoalkyl group or a halogen atom, and $R^1$ represents a hydrocarbon group such as an alkyl, cycloalkyl, aryl, alkenyl or alkoxyalkyl group, with the proviso that nR's and $(4-n)OR^1$ groups may be identical or different respectively. Siloxanes having $OR^1$ groups and silyl esters of carboxylic acids may be cited as examples of the organosilicon compounds. Compounds in which two or more silicon atoms are bonded to each other via an oxygen or nitrogen atom may also be cited as examples. These organosilicon compounds may be prepared by reacting compounds not having an Si—O—C bond with compounds having an O—C bond either in advance or in situ during polymerization to form compounds having an Si—O—C bond. For example, halogen-containing silane compounds having no Si—O—C bond or silicon hydrides may be used jointly with alkoxy-containing aluminum compounds, alkoxy-containing magnesium compounds, metal alcoholates, alcohols, formic acid esters or ethylene oxide. The organosilicon compounds may contain other atoms such as aluminum or tin.

Examples of the organosilicon compounds as the catalyst component (D) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-ptolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxy-silane, n-propyltriethoxysilane, decyltrimethoxysilane, decyltriethoxysilane, phenyltrimethoxysilane, gammachloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane and dimethyltetraethoxydisiloxane. Above all, ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, diphenyldiethoxysilane and ethyl silicate.

Suitable examples of the sterically hindered amines (D) are 2,2,6,6-tetramethylpiperidine, 2,2,5,5-tetramethylpyrrolidine, derivatives of these compounds, and tetramethylmethylenediamine. The component (D) may be used in the form of an adduct with another compound.

The catalyst used in the process of polymerizing olefins in this invention is a catalyst formed by contacting the components (A), (B), (C) and (D) in an inert medium in the absence of an alpha-olefin. Various contacting methods may be employed depending upon the contacting sequence of the individual components.

The preferred proportions of the individual components in contacting in an inert medium are as follows, for example. The proportion of the metal atom $MK_1$ in component (B) per gram atom of titanium in component (A) is usually 1 to 50 gram-atoms, preferably 2 to 30 gram-atoms. The proportion of component (C) per gram atom of titanium in component (A) is usually 0.1 to 10 moles, preferably 0.3 to 3 moles. The proportion of component (D) per gram-atom of titanium in component (A) is usually 0.3 to 10 moles, preferably 0.7 to 5 moles, The contacting treatment is carried out in the inert medium. Examples of the inert medium are aliphatic hydrocarbons such as ethane, propane, butane, pentane, methylpentane, hexane, heptane, octane, decane, gasoline, kerosene and light oils; alicyclic hydrocarbons such as cyclohexane and methylcyclohexane; and aromatic hydrocarbons such as benzene, toluene and xylene. Mixtures of two or more of these may also be used.

The temperature at the time of the contacting treatment is usually −50 to 100° C., preferably −20 to 30° C. The contacting treatment time is usually 1 minute to 10 hours, preferably 5 minutes to 2 hours.

The contacting treatment is carried out in the absence of an olefin component. The contacting treatment gives the catalyst in the form of a suspension. The suspension may be used directly in the process of this invention; or the resulting catalyst may be separated from the suspension and then used in the process.

The process for polymerizing olefins in accordance with this invention is carried out in the presence of the catalyst formed by the above contacting treatment. The polymerization reaction of an olefin may usually be performed in the vapor phase or the liquid phase. For example, it may be carried out in the above-exemplified inert medium, or in an alpha-olefin medium used as a polymerization material. It may also be performed in a mixture of the medium and the alpha-olefin. The polymerization reaction may, of course, be carried out in the esence of only the catalyst formed by the above contacting treatment. In addition to the catalyst formed by the contacting treatment, any one to three of the componets (B) to (D) may be used together by contacting treatment. This contacting treatment may be carried out in the absence or presence of an olefin.

The alpha-olefin that can be used in the polymerization in the processs of this invention is an alpha-olefin having 2 to 10 carbon atoms such as ethylene, porpylene, 1-butene, 4-methyl-1-pentene and 1-octene. They may be subjected to not only homopolymerization but also random copolymerization or block copolymerization. In the copolymerization, a polyunsaturated compound such as a conjugated or non-conjugated diene may be selected as a comonomer component. Preferably, the process of this invention is applied to the homopolymerization of propylene, 1-butene or 4-methyl-1-pentene or to the copolymerization of a mixture of a major proportion (for example, at least 50 mole %, preferably at least 70 mole %) of propylene or 1-butene with another olefin.

The proportions of the catalyst components present in the polymerization system in the process of this invention are as follows: The proportion of the catalyst component (A), calculated as Ti atom, is, for example, about 0.001 to about 0.5 mg-atom/liter, especially about 0.005 to about 5 mg-atom/liter; the proportion of the catalyst component (B) is such that the proportion of the metal atom in component (B) is, for example, 1 to about 2000 g-atom, preferably about 5 to about 500 g-atm, per gram atom of the titanium atom in the catalyst component (A); and the proportion of the catalyst component (D) is such that the proportion of component (D) is, for example, about 0.1 to about 500 moles, preferably about 0.5 to 100 moles, per g-atom of the titanium atom in the catalsyt component (A).

When the polymerization reaction is carried out by adding a fresh supply of the catalyst component (B) in addition to the catalyst formed by the preliminary contacting treatment, the proportion of the above component (B) additionally supplied is about 1 to about 2000 g-atoms, preferably about 10 to bout 500 g-atoms, as the metal atom in component (B) per g-atom of the titanium atom in the catalyst component (A). Likewise, when the catalyst component (D) is additionally supplied to the catalyst formed by the preliminary contacting treatment in the above polymerization, the proportion of the component (D) additionally supplied is about 0 to 1000 moles, preferably about 0 to about 100 moles, per g-atom of titanium in the catalyst component (A).

The temperature for polymerizing an olefin is preferably about 20 to about 200° C., more preferably about 50 to about 120° C. The pressure is, for example, atmospheric pressure to about 100 kg/cm$^2$, preferably about 2 to about 50 kg/cm$^2$. The polymerization may be carried out batchwise, semicontinuously or continuously. It is also possible to perform the polymerization in two or more stages having different reaction conditions.

Investigations of the present inventors have shown that according to this invention, the above objects and advantages of the invention are secondly achieved by a process which comprises preliminarily polymerizing an alpha-olefin in the presence of a catalyst formed from (A') a highly active solid titanium catalyst component containing magnesium, titanium and halogen atoms, (B) an organometal compound of a metal of Group 1 to 3 of the periodic table, and (C) a catalyst component selected from transition metal compounds soluble in an inert medium and organic halogen compounds, and polymerizing an alpha-olefin in the presence of the resulting catalyst used in the preliminary polymerization of the alpha-olefin.

The titanium catalyst component (A') used in this invention is a highly active catalyst component containing magnesium, titanium and halogen as essential ingredients, and a specific electron donor to be described hereinbelow as an optional ingredient. The titanium catalyst component (A') differs from the titanium catalyst component (A) described above only in respect of the inclusion of the electron donor as an optional ingredient. Accordingly, it should be understood that the above description of the titanium catalyst component (A) applies to the titanium catalyst component (A') except that the latter contains the electron donor as an optional component. In the second process of this invention, too, it is preferred to use the titanium catalyst (A') containing the electron donor, namely the same catalyst as the catalyst (A) described hereinabove.

As the catalyst components (B) and (C), the same compounds as used in the first process described above can be used. In addition to the catalyst components (A'), (B) and (C), the same organosilicon compounds or sterically hindered amines as the catalyst component (D) described above may be used. When the catalyst component (D) is used, polymers having especially superior stereoregularity can be obtained from alpha-olefins having at least three carbon atoms such as propylene with high activity.

The second process of polymerizing an olefin in accordance with this invention comprises preliminarily polymerizing an alpha-olefin in the presence of a catalyst formed from components (A'), (B) and (C) and optionally (D) and polymerizing an alpha-olefin in the presence of the resulting catalyst used in preliminary polymerization of the alpha-olefin. In the process of this invention, the following methods may be used to form a catalyst resulting from preliminary polymerization of an alpha-olefin.

(1) The components (A'), (B) and (C) and optionally (D) are contacted in an inert medium to form a catalyst, and then the alpha-olefin is contacted with the catalyst.

(2) The components (A'), (B) and (C) and optionally (D) in the presence of the alpha-olefin, optionally in an inert medium or an alpha-olefin medium.

(3) A catalyst is prepared in advance by contacting the components (A'), (B) and (C) and optionally (D). The catalyst is then contacted with the alpha-olefin optionally in an inert solvent or an alpha-olefin medium.

In the case of contacting the components (A'), (B) and (C) and optionally (D) in the absence of the alpha-olefin in the process of this invention, the contacting treatment temperature is usually −50 to 100° C., preferably −20 to 30° C. The contacting treatment time is usually 1 minute to 10 hours, preferably 5 minutes to 2 hours. The contacting treatment is carried out in the absence of the alpha-olefin, as requried in an inert medium. When it is carried out in an inert medium, the catalyst is formed as a suspension. The catalyst in the form of a suspension may be used as such in the preliminary polymerization of the alpha-olefin. It is also possible to separate the catalyst from the suspension, and use it in the preliminary polymerization of the alpha-olefin.

By contacting the components (A'), (B) and (C) and optionally (D) in the presence of the alpha-olefin optionally in an inert medium or an alpha-olefin medium in the process of his invention, the formation of the catalyst and the preliminary polymerization of the alpha-olefin can be carried out simultaneously or consecutively.

In the process of this invention, the proportions of the components (A'), (B) and (C) and optionally (D) in the formation of the catalyst or the preliminary polymerization of the alpha-olefin are as follows: The proportion of the metal atom $M_1$ of component (B) is usually 1 to 100 g-atoms, preferably 2 to 30 g-atoms, per g-atom of titanium in component (A'). The proportion of the transition metal atom $M_2$ in component (C) is usually 0.1 to 10 g-atoms, preferably 0.4 to 3 g-atoms, per gram atom of titanium in component (A'). The proportion of component (D) is usually 0.3 to 30 moles, preferably 0.7 to 5 moles, per g-atom of titanium in component (A').

The preliminary polymerization in the process of this invention is carried out by polymerizing 0.5 to 500 g, preferably 1 to 100 g, more preferably 2 to 10 g, of the alpha olefin per g-atom of the highly active solid titanium catalyst component (A'). The alpha-olefin used in the preliminary polymerization may be, for example, ethylene or an alpha-olefin having 3 to 20 carbon atoms such as propylene, 1-butene, 4-methyl-1-pentene, 1-hexene, 1-octene, 1-decene, 1-dodecene or 1-tetradecene. Propylene is preferred.

The preliminary polymerization temperature may be, for example, −20 to 70° C., preferably −100 to 60° C., more preferably 0 to 50° C. The time required for preliminary polymerization is usually 0.5 to 20 hours, preferably 1 to 10 hours.

The preliminary polymerization may be carried out batchwise or continuously. The preliminary polymerization may be carried out either under atmospheric pressure or elevated pressure. The presence of a molecular weight controlling agent such as hydrogen in the preliminary polymerization is possible. Preferably, however, the molecular weight controlling agent is used in such an amount as to give a preliminary polymer having an intrinsic viscosity [η], measured in decalin at 135° C., of at least 0.2 dl/g, preferably 0.5 to 20 dl/g.

The preliminary polymerization is carried out without a solvent or in an inert medium. In view of operability, the preliminary polymerization is preferably carried out in an inert hydrocarbon medium. The inert hydrocarbon medium used in the preliminary polymerization may be the same solvents as exemplified above as the inert hydrocarbon medium.

The concentration of the solid catalyst in the preliminary polymerization reaction system in the preliminary polymerization, as the concentration of the transition metal atom in the solid catalyst, is, for example, $10^{-6}$ to 1 g-atom/liter, preferably $10^{-4}$ to $10^{-2}$ g-atom/liter.

Examples of the inert medium which was used for forming the catalyst or the preliminary polymerization of the alpha-olefin include aliphatic hydrocarbons such as ethane, propane, butane, pentane, methylpentane, hexane, butane, octane, decane, gasoline, kerosene and light oils, alicyclic hydrocarbons such as cyclohexane and methylcyclohexane, and aromatic hydrocarbons such as benzene, toluene and xylene. They may also be used as a mixture of two or more. Likewise, the alpha-olefins exemplified above as alpha-olefins for preliminary polymerizing merization may also be cited as examples of the alpha-olefin medium.

In the process for polymerizing alpha-olefins in this invention, the catalyst used in the preliminary polymerization of the alpha-olefin is obtained as a suspension. The suspension may be directly used, or the formed catalyst may be separated from the suspension and used.

The catalyst formed and used in the preliminary polymerization of the alpha-olefin shows excellent polymerizing merization activity in the polymerization of the alpha-olefin.

The polymerization of the alpha-olefin using the catalyst obtained by the preliminary polymerization can be carried out under quite the same conditions as in the first process of this invention.

The process of this invention, particularly when applied to the stereoregular polymerization of alpha-olefins having at least 3 carbon atoms, can give polymers having a high stereoregular index with high catalytic efficiency. With regard to the high activity of the catalyst used in this invention, the yield of the polymer per unit weight of the solid catalyst component is better than conventional catalysts to obtain polymers of the same stereoregularity index. Hence, the catalyst residue, particularly the halogen, in the polymer can be decreased. Consequently, the operation of removing the catalyst can be omitted, and in molding the polymer, the corroding tendency of the mold can be markedly suppressed.

EXAMPLES

The following examples further illustrate the present invention.

In the examples, t-II is a measure of the total isotacticity index of the polymer, and was measured by the following method.

The polymer slurry was filtered to separate it into the mother liquor and the polymer powder. The polymer powder was subjected to Soxhlet extraction with boiling n-heptane for 6 hours. Throughout the above operation, the amount [C (g)] of the polymer dissolved in the mother liquor, the amount [B (g)] of a portion soluble in boiling n-heptane and the amount [A (g)] of a portion insoluble in boiling n-heptane were measured, and t-II was calculated in accordance wilth the following formula.

$$t-II\ (\%) = \frac{A}{A+B+C} \times 100$$

Example 1

Preparation of a Solid Ti Catalyst Component (A):

Anhydrous magnesium chloride (7.14 g; 75 mmol), 35 ml of decane and 35.1 ml (225 mmol) of 2-ethylhexyl alcohol were reacted at 130° C. for 2 hours to form a uniform solution. Phthalic anhydride (1.7 g; 11.3 mmol) was added to the solution, and the mixture was stirred at 130° C. for 1 hour to dissolve phthalic anhydride in the uniform solution. The resulting uniform solution was cooled to room temperature, and all added dropwise over 1 hour to 200 ml (1.8 mol) of titanium tetrachloride maintained at −20° C.

After the addition, the temperature of the mixture was elevated to 110° C. over 4 hours. When the temperature reached 110° C., 5.03 ml (18.75 mmol) of diisobutyl phthalate was added, and the mixture was maintained at the same temperature for 2 hours with stirring. After the reaction for two hours, the reaction mixture was hot-filtered to collect a solid portion. The solid portion was suspended again in 275 ml of $TiCl_4$, and again reacted at 110° C. for 2 hours. After the reaction, the solid portion was collected by hot filtration, and fully washed with decane and hexane at 110° C. until no free titanium compound was detected from the washings. The solid titanium catalyst component (A) synthesized by the above method was stored as a hexane slurry. The concentration of the catalyst in the slurry was also measured. The solid titanium catalyst component (A) obtained by drying part of the slurry was found to comprise 2.4% by weight of titanium, 56% by weight of chlorine, 19% by weight of magnesium and 13.6% by weight of diisobutyl phthalate.

Preliminary Treatment of the Solid Titanium Catalyst Component (A):

A 400 ml four-necked glass reactor equipped with a stirrer was charged with 100 ml of purified hexane, 10 millimol of triethyl aluminum, 2 millimol of diphenyldimethoxysilane, 2.0 g of the solid titanium catalyst component (A) and 0.5 millimole of t-butyl chloride, and they were mixed with stirring at 20° C. for 1 hour. The mixture was left to stand and subjected twice to a washing operation comprising removing the supernatant and adding purified hexane. The washed mixture was suspended again in purified hexane and the entire suspension was transferred into a catalyst bottle. The entire volume was measured at this time, and the concentration of the catalyst in the slurry was also measured.

Polymerization:

A 2-liter autoclave was charged with 750 ml of purified hexane, and in an atmosphere of propylene at room temperature, 0.75 mmol of triethylammonium, 0.075 cmol of diphenyldimethoxysilane and 0.0075 mmol, as the titanium atom, of the preliminarily treated product of the catalyst component (A) [corresponding to 22.3 mg calculated as the catalyst component (A)] were fed into the autoclave. Hydrogen (200 ml) was introduced into the autoclave, the temperature was elevated to 70° C. Propylene was polymerized for 2 hours at this temperature. During the polymerization, the pressure was maintained at 7 kg/cm$^2$-G.

After the polymerizingmerization, the slurry containing the resulting polymer was filtered to separate it into a white powdery polymer and a liquid portion. The amount of the white powdery polymer after drying was 320.2 g. The polymer had a boiling n-heptane extraction residue of 98.4%, and MI of 5.8 and an apparent density of 0.44 g/ml. On the other hand, concentration of the liquid phase portion gave 1.5 g of a solvent-soluble polymer. Accordingly, the activity was 14,600 g PP/g-catalyst (PP: polypropylene). II determined on all polymers was 97.9%.

Comparative Example 1

The same preliminary treating operation as in Example 1 was carried out except that in preliminarily reacting the titanium catalyst component (A), 0.5 millimol of t-butyl chloride was not added. The polymerizing merization was carried out as in Example 1. The results of the polymerization are shown in Table 1.

Examples 2–5

The same preliminary contacting operation and the same polymerization of propylene as in Example 1 were carried out except that the amount of t-butyl chloride added was changed as in Table 1, and the solvent used at the time of the preliminary contacting was changed as shown in Table 1. The results are shown in Table 1.

TABLE 1

| | Conditions for preliminary contacting | | | Results of the polymerization | | |
|---|---|---|---|---|---|---|
| Run No. (*) | Amount of the organic halogen compound (mmol) | Type of the inert medium | Polymerization activity [g-pp/g-cat] | t-II [%] | MI [dg/min] | BD [g/ml] |
| EX. 1 | 0.5 | hexane | 14,400 | 97.9 | 5.8 | 0.44 |
| CEX. 1 | 0 | hexane | 12,400 | 97.8 | 6.7 | 0.44 |
| EX. 2 | 0.4 | hexane | 14,100 | 97.6 | 7.7 | 0.44 |
| EX. 3 | 1.0 | hexane | 14,000 | 97.4 | 5.8 | 0.44 |
| EX. 4 | 1 | toluene | 14,200 | 97.6 | 5.8 | 0.44 |
| EX. 5 | 1 | isodecane | 14,400 | 97.5 | 6.9 | 0.44 |

(*): EX. = Example;
CEX. = Comparative Example

Example 6

Preparation of a Solid Titanium Catalyst Component (A):

A 2-liter high-speed stirring device (made by Tokushu Kika Kogyo K. K.) was fully purged with $N_2$, and then 700 ml of purified kerosene, 10 g of commercial $MgCl_2$, 24.2 g of ethanol and 3 g of sorbitan distearate (Emasol 320, a product of Kao-Atlas Co., Ltd.) were put in the stirring device. The system was heated with stirring, and the mixture was stirred at 120° C. for 30 minutes at 800 rpm. With high-speed stirring, the mixture was transferred by means of a Teflon tube having an inside diameter of 5 mm into a 2-liter glass flask equipped with a stirrer in which 1 liter of purified kerosene cooled at −10° C. had been put. The resulting solid was collected by filtration, and sufficiently washed with hexane to obtain a carrier.

The carrier (7.5 g) was suspended in 150 ml of titnium tetrachloride at room temperature, and then 33 ml of di-n-octyl cyclohexanedicarboxylate was added. After mixing with stirring at 120° C. for 1.5 hours, the supernatant liquid was removed by decantation. The solid was again suspended in 150 ml of titanium tetrachloride and they were stirred and mixed at 130° C. for 1 hour. From the reaction mixture, the solid reaction product was collected by filtration and washed with a sufficient amount of purified hexane to give a solid catalyst component (A) comprising 2.6% by weight of titanium, 60% by weight of chlorine and 19% by weight of magnesium as atoms.

Preliminary Treatment of the Titanium Catalyst Component (A):

The same preliminary treatment and the same polymerization of propylene, as in Example 1 were carried out except that the titanium catalyst component obtained above was used instead of the titanium catalyst component used n Example 1 in the preliminary treatment. The results are shown in Table 2.

Comparative Example 2

The same preliminary treatment and the same polymerization as in Example 6 were carried out except that 0.5 mmole of t-butyl chloride was not added in the preliminary treatment of the titanum catalyst component (A) in Example 6. The results of the polymerization are shown in. Table 2.

Example 7

Preparation of a Solid Titanium Catalyst Component (A):

Six grams of flaky Mg metal and 100 ml of n-hexane were added to a 400 ml flask, washed at 68° C. for 1 hour, and then dried with nitrogen. Then, 52 g of ethyl silicate was added and 0.1 ml of a solution of 1 g of iodine in 5 ml of methyl iodide was added. Furthermore, a solution composed of 50 ml of n-hexane and 25 g of n-BuCl was added over the course of 1 hour. The mixture was maintained at 70° C. for 6 hours, and after the reaction, washed six times with n-hexane. Seven grams of the resulting solid was suspended in 100 ml of TiCl$_4$, and 5.5 mmol of diisobutyl phthalate was added. The mixture was reacted at 120° C. for 1 hour, and the supernatant was removed by decantation. Again, 100 ml of TiCl$_4$ was added, and the reaction was carried out at 120° C. for 1 hour. After the reaction, the mixture was fully washed with hexane to prepare a solid Ti catalyst (A). This titanium catalyst component (A) comprised 2.8% by weight of titanium, 60% by weight of chlorine, 19% by weight of magnesium and 11.3% by weight of diisobutyl phthalate.

Preliminary Treatment of the Titanium Catalyst Component (A):

The same preliminary treatment and the same polymerization of propylene as in Example 1 were carried out except that in the preliminary treatment, the titanium catalyst component obtained above was used instead of the titanium catalyst component used in Example 1. The results are shown in Table 2.

Comparative Example 3

The same preliminary treatment and the same polymerization as in Example 7 were carried out except that in the preliminary treatment of the titanium catalyst component (A) in Example 7, 0.5 mmol of t-butyl chloride was added. The results of the polymerization are shown in Table 2.

TABLE 2

| | Conditions for preliminary contacting | | Results of the polymerization | | | |
|---|---|---|---|---|---|---|
| Run No. | Amount of the organic halogen compound (mmol) | Type of the inert medium | Polymerization activity [g-pp/g-cat] | t-II [%] | MI [dg/min] | BD [g/ml] |
| EX. 6 | 0.5 | hexane | 12,100 | 96.4 | 7.3 | 0.45 |
| CEX. 2 | 0 | hexane | 10,300 | 96.5 | 5.5 | 0.45 |
| EX. 7 | 0.5 | hexane | 12,700 | 97.1 | 6.6 | 0.44 |
| CEX. 3 | 0 | hexane | 11,000 | 97.0 | 5.8 | 0.44 |

Examples 8–12

A titanium catalyst component (A) was prepared, and then preliminarily treated, and propylene was polymerized, in the same way as in Example 6 except that each of the electron donors indicated in Table 3 was used instead of di-n-octyl cyclohexanedicarboxylate used in the preparation of the Ti catalyst component (A), and each of the electron donors shown in Table 3 was used instead of diphenyldimethoxysilane used in the preliminary treatment of the titanium catalyst component (A) and in the polymerization of propylene. The results are shown in Table 3.

Comparative Examples 4–8

The same preliminary treatment and the same polymerization of propylene as in Examples 8 to 12 were carried out except that in the preliminary treatment of the titanium catalyst component (A) in Examples 8 to 12, t-butyl chloride was not added. The results are shown in Table 3.

Examples 13–14

The same preliminary treatment and the same polymerization as in Example 1 were carried out except that each of the organic halogen compounds indicated in Table 4 was used instead of t-butyl chloride used in the preliminary treatment in Example 1. The results are shown in Table 4.

TABLE 3

| Run No. | Catalyst synthesis Electron donor added at the time of catalyst synthesis | Electron donor added at the time of preliminary treatment and polymerization | Amount of t-Butyl chloride (mmol) | Polymerization activity [g-pp/g-cat] | t-II [%] | MI [dg/min] | BD [g/ml] |
|---|---|---|---|---|---|---|---|
| EX. 8 | Diethyl 2-allylmalonate | Diphenyldimethoxysilane | 1 | 11,000 | 96.3 | 7.3 | 0.44 |
| CEX. 4 | " | " | 0 | 9,700 | 96.4 | 7.5 | 0.44 |
| EX. 9 | Di-n-hexyl phtalate | Di-n-propyldimethoxysilane | 1 | 12,300 | 97.0 | 7.6 | 0.44 |
| CEX. 5 | " | " | 0 | 10,600 | 97.0 | 5.5 | 0.44 |
| EX. 10 | Di-n-octyl cyclohexene-4.5-dicarboxylate | bis-Tolyldimethoxysilane | 1 | 10,700 | 97.0 | 8.9 | 0.44 |
| CEX. 6 | Di-n-octyl cyclohexene-4.5-dicarboxylate | " | 0 | 9,300 | 97.1 | 8.9 | 0.44 |
| EX. 11 | iso-Butyl phthalate | tert-Butyltriethoxysilane | 1 | 9,600 | 96.3 | 4.6 | 0.44 |
| CEX. 7 | " | " | 0 | 8,300 | 96.4 | 7.3 | 0.44 |
| EX. 12 | iso-Butyl phthalate | 2,2,6,6-Tetramethylpiperidine | 1 | 9,100 | 96.1 | 10.2 | 0.44 |
| CEX. 8 | " | " | 0 | 7,900 | 96.3 | 3.9 | 0.43 |

TABLE 4

| Run No. | Organic halogen compound | Polymerization activity [g-pp/g-cat] | t-II [%] | MI [dg/min] | BD [g/ml] |
|---|---|---|---|---|---|
| EX. 13 | sec-Butyl chloride | 14,300 | 97.6 | 3.8 | 0.44 |
| EX. 14 | tert-Amyl chloride | 14,300 | 97.6 | 7.2 | 0.44 |
| EX. 15 | iso-Propyl chloride | 14,000 | 97.5 | 6.5 | 0.44 |

Example 16
Preparation and Preliminary Treatment of a Solid Titanium Catalyst Component (A):

The same solid titanium catalyst component (A) as obtained in Example 1 was preliminarily treated in the same way as in the preliminary treatment in Example 1 except that 1 mmol of titanium tetrachloride was used instead of 0.5 mmol of t-butyl chloride.

Polymerization:

A 2-liter autoclave was charged with 750 ml of purified hexane, and in an atmosphere of propylene at room temperature, 0.75 mmol of triethyl aluminum, 0.075 mmol of diphenyldimethoxysilane and 0.0075 mmole, calculated as the titanium atom, of the above preliminarily reacted product of the catalyst component (A) [corresponding to 9.8 mg as the catalyst component (A)] were added. Hydrogen (200 ml) was introduced into the autoclave, and the temperature was elevated to 70° C. Propylene as polymerized for 2 hours while the pressure during polymerization was maintained at 7 kg/cm²-G.

After the polymerization, the slurry containing the resulting polymer was filtered to separate it into a white powdery polymer and a liquid phase portion. The amount of the white powdery polymer obtained after drying was 165.9 g. The polymer had a boiling n-heptane extraction residue of 98.1%, an MI of 9.4 and an apparent density of 0.44 g/ml. On the other hand, concentrating the liquid phase portion gave 0.9 g of a solvent-soluble polymer. Accordingly, the activity was 17,000 g-PP/g-catalyst, and II determined with respect to all polymers was 97.6%.

Comparative Example 9

The same preliminary treatment and the same polymerization as in Example 16 were carried out except that 1 mmol of titanium tetrachloride was not added at the time of preliminary treatment of the Ti catalyst component (A) in Example 16. The results of the polymerizing merization are shown in Table 5.

Examples 17–20

The same preliminary contacting and the same polymerization of propylene as in Example 16 were carried out except that the amount of TiCl₄ added was changed as in Table 5, and each of the solvents shown in Table 5 was used at the time of the preliminary contacting. The results are shown in Table 5.

TABLE 5

| | Conditions for preliminary contacting | | Results of the polymerization | | | |
|---|---|---|---|---|---|---|
| Run No. | Amount of the transition metal compound (mmol) | Type of the inert mediu | Polymerization activity [g-pp/g-cat] | t-II [%] | MI [dg/min] | BD [g/ml] |
| EX. 16 | 1 | hexane | 17,000 | 97.6 | 9.4 | 0.44 |
| CEX. 9 | 0 | hexane | 12,400 | 97.8 | 6.7 | 0.44 |
| EX. 17 | 1.5 | hexane | 16,700 | 97.7 | 8.6 | 0.44 |
| EX. 18 | 0.7 | hexane | 16,100 | 97.8 | 5.9 | 0.44 |
| EX. 19 | 1 | toluene | 15,900 | 97.8 | 4.6 | 0.44 |
| EX. 20 | 1 | isodecane | 16,600 | 97.7 | 8.2 | 0.44 |

Example 21

The same solid titanium catalyst component (A) as prepared in Example 6 was preliminary treated in the same way as in Example 16, and propylene was polymerized in the same way as in Example 16. The results are shown in Table 6.

Comparative Example 10

The same preliminary treatment and the same polymerization as in Example 21 were carried out except that 1 mmol of titanium tetrachloride was not added at the time of preliminary treating the titanium catalyst component (A) in Example 21. The results of the polymerizing merization are shown in Table 6.

Example 22

The same solid titanium catalyst component (A) as prepared in Example 7 was preliminarily treated, and propylene was polymerized, in the same way as in Example 16. The results of the polymerization are shown in Table 6.

Comparative Example 11

The same preliminary treatment and the same polymerization as in Example 22 were carried out except that 1 mmol of titanium tetrachloride was not added in the preliminary treatment of the titanium catalyst component (A) in Example 22. The results of the polymerizing merization are shown in Table 6.

Examples 23–17

A Ti catalyst component (A) was prepared and preliminarily treated, and propylene was polymerized, in the same way as in Example 21 except that each of the electron donors indicated in Table 7 was used instead of di-n-octyl cyclohexanedicarboxylate used in the preparation of the titanium catalyst component (7) and each of the electron donors shown in Table 7 was used instead of diphenyldimethoxysilane used in the preliminary treatment of the titanium catalyst component (A) and the polymerization of propylene. The results are shown in Table 7.

Comparative Examples 12–16

The same preliminary treatment and the same polymerization of propylene as in Examples 23 to 27 were carried out except that $TiCl_4$ was not added at the time of preliminary treatment of the titanium catalyst component (A) in Examples 23 to 27. The results are shown in Table 7.

TABLE 6

| | Conditions for preliminary contacting | | Results of the polymerization | | | |
|---|---|---|---|---|---|---|
| Run No. | Amount of the transition metal compound (mmol) | Type of the inert mediu | Polymerization activity [g-pp/g-cat] | t-II [%] | MI [dg/min] | BD [g/ml] |
| EX. 21 | 1 | hexane | 14,600 | 96.6 | 6.8 | 0.45 |
| CEX. 10 | 0 | hexane | 10,300 | 96.5 | 5.5 | 0.45 |
| EX. 22 | 1 | hexane | 15,300 | 97.2 | 7.6 | 0.44 |
| CEX. 11 | 0 | hexane | 11,000 | 97.0 | 5.8 | 0.44 |

TABLE 7

| | Catalyst synthesis | Conditions for preliminary contacting | | Results of the polymerization | | | |
|---|---|---|---|---|---|---|---|
| Run No. | Electron donor added at the time of catalyst synthesis | Electron donor added at the time of preliminary treatment and polymerization | Amount of TiCl added (mmol) | Polymerization activity [g-pp/g-cat] | t-II [%] | MI [dg/min] | BD [g/ml] |
| EX. 23 | Diethyl 2-allylmalonate | Diphenyldimethoxysilane | 1 | 13,300 | 96.5 | 8.6 | 0.44 |
| CEX. 12 | " | " | 0 | 9,700 | 96.4 | 7.5 | 0.44 |
| EX. 24 | Di-n-hexyl phtalate | Di-n-propyldimethoxysilane | 1 | 13,300 | 97.0 | 8.7 | 0.44 |
| CEX. 13 | " | " | 0 | 10,600 | 97.0 | 5.5 | 0.44 |
| EX. 25 | Di-n-octyl cyclohexene-4.5-dicarboxylate | bis-Tolyldimethoxysilane | 1 | 13,000 | 97.1 | 6.6 | 0.44 |
| CEX. 14 | Di-n-octyl cyclohexene-4.5-dicarboxylate | " | 0 | 9,300 | 97.1 | 8.9 | 0.44 |
| EX. 26 | Di-isobutyl phthalate | tert-Butyltriethoxysilane | 1 | 11,600 | 96.7 | 5.6 | 0.44 |
| CEX. 15 | " | " | 0 | 8,300 | 96.4 | 7.3 | 0.44 |

TABLE 7-continued

| | Catalyst synthesis | Conditions for preliminary contacting | | Results of the polymerization | | | |
|---|---|---|---|---|---|---|---|
| | Electron donor | Electron donor | | | | | |
| | added at the time | added at the time of | TiCl | Polymerization | | | |
| | of catalyst | preliminary treatment | added | activity | t-II | MI | BD |
| Run No. | synthesis | and polymerization | (mmol) | [g-pp/g-cat] | [%] | [dg/min] | [g/ml] |
| EX. 27 | Di-isobutyl phthalate | 2,2,6,6-tetramethylpiperidine | 1 | 10,800 | 96.2 | 3.6 | 0.44 |
| CEX. 16 | " | " | 0 | 7,900 | 96.3 | 3.9 | 0.43 |

Example 28

The same solid titanium catalyst component (A) as prepared in Example 1 was prepared.

Preliminary Treatment of the Titanium Catalyst Component (A):

Into a 400 ml four-necked glass reactor equipped with a stirrer were fed under a nitrogen atmosphere 100 ml of purified hexane, 1.0 mmol of triethyl aluminum, 2 mmol of diphenyldimethoxysilane, 0.5 mmol of tert-butyl chloride and 2.0 g of the solid titanium catalyst component (A). Then, at a temperature of 20° C., propylene was fed into the reactor for 1 hour at a rate of 2 Nl/hr. When the supply of propylene ended, the inside of the reactor was replaced by nitrogen. The product was subjected twice to a washing operation comprising removing the supernatant and adding purified hexane. The washed product was again suspended in purified hexane, and all transferred into a catalyst bottle. The entire volume was measured, and the concentration of the catalyst in the slurry was also measured.

Polymerization:

A 2-liter autoclave was charged with 750 ml of purified hexane, and at 60° C. in an atmosphere of propylene, 0.75 mmol of triethyl aluminum, 0.075 mmole of diphenyldimethoxysilane and 0.0075 mmol, calculated as the titanium atom, of the preliminarily treated product of the catalyst component (A) [corresponding to 22.8 mg calculated as the catalyst component (A)] were added. Hydrogen (200 ml) was introduced, and the temperature was elevated to 70° C. Propylene was polymerized for 2 hours while the pressure during the polymerization was maintained at 7 kg/cm²-G.

After the polymerization, the slurry containing the resulting polymer was filtered to separate it into a white powdery polymer and a liquid-phase portion. The amount of the white powdery polymer obtained after drying was 334.5 g. It had a boiling n-heptane extraction residue of 98.9%, an MI of 2.7 and an apparent density of 0.44 g/ml. On the other hand, concentration of the liquid-phase portion gave 1.3 g of a solvent-soluble polymer. The activity was therefore 14,100 g-PP/g-catalyst, and II determined with respect to all polymers was 98.5%.

Comparative Example 17

The same preliminary treatment and the same polymerization as in Example 28 were carried out except that 8.5 mmol of t-butyl chloride was not added at the time of preliminarily treating the titanium catalyst component (A). The results of the polymerization are shown in Table 8.

Examples 29–32

The same preliminary contacting and the same polymerization of propylene as in Example 28 were carried out except that the amount of t-butyl chloride was changed as shown in Table 8, and each of the solvents indicated in Table 8 was used as the solvent during preliminary contacting. The results are shown in Table 8.

Example 33

The same preliminary contacting and the same polymerization of propylene as in Example 28 were carried out except that the feed rate of propylene and the preliminary contacting time in Example 28 were changed to 8 Nl/hr and 4 hours, respectively. The results are shown in Table 8.

TABLE 8

| | Conditions for preliminary contacting | | | Results of the polymerization | | | |
|---|---|---|---|---|---|---|---|
| | Amount of | | Amount of α-olefin | | | | |
| | tert-butyl | | polymerized | Polymerization | | | |
| | chloride added | Type of the | preliminary | activity | t-II | MI | BD |
| Run No. | (mmol) | inert medium | [g-pp/g-cat] | [g-pp/g-cat] | [%] | [dg/min] | [g/ml] |
| EX. 28 | 0.5 | hexane | 2.8 | 14,100 | 98.5 | 2.7 | 0.44 |
| CEX. 17 | 0 | hexane | 2.7 | 11,600 | 98.5 | 4.0 | 0.44 |
| EX. 29 | 1.0 | hexane | 2.7 | 13,300 | 98.5 | 3.6 | 0.44 |
| EX. 30 | 1.5 | hexane | 2.8 | 13,100 | 98.7 | 1.9 | 0.43 |
| EX. 31 | 0.5 | toluene | 2.8 | 14,000 | 98.4 | 2.9 | 0.44 |
| EX. 32 | 0.5 | isodecane | 2.8 | 13,700 | 98.5 | 6.3 | 0.44 |
| EX. 33 | 0.5 | hexane | 2.6 | 14,900 | 98.5 | 5.4 | 0.45 |

Example 34

The same solid titanium catalyst component (A) as prepared in Example 6 was preliminarily treated, and then propylene was polymerized, in the same way as in Example 28. The results are shown in Table 9.

Comparative Example 18

The same preliminary treatment and the same polymerization as in Example 34 were carried out except that 0.5 mmol of t-butyl chloride was not added in the preliminary treatment of the titanium catalyst component (A) in Example 34.

Example 35

The same solid titanium catalyst component (A) as prepared in Example 7 was preliminarily treated, and propylene was polymerized, in the same way as in Example 28. The results are shown in Table 9.

Comparative Example 19

The same preliminary treatment and the same polymerization as in Example 35 were carried out except that 1 mmol of titanium tetrachloride was not added in the preliminary treatment of the titanium catalyst component (A) in Example 35. The results of the polymerizing merization are shown in Table 9.

merized, in the same way as in Example 34 except that in Example 34, each of the electron donors indicated in Table 9 was used instead of di-n-octyl cyclohexanedicarboxylate used in preparing the titanium catalyst component (A), and each of the electron donors indicated in Table 9 was used instead of diphenyldimethoxysilane used in the preliminary treatment of the titanium catalyst component (A) and the polymerization of propylene. The results are shown in Table 10.

Comparative Examples 20–23

The same pre-treatment and the same polymerization of propylene as in Examples 36 to 39 were carried out except that TiCl$_4$ was not added in the pre-treatment of the titanium catalyst component (A) in Examples 36 to 39. The results are shown in Table 10.

TABLE 9

| | Conditions for preliminary contacting | | Amount of α-olefin polymerized preliminary [g-pp/g-cat] | Results of the polymerization | | | |
|---|---|---|---|---|---|---|---|
| Run No. | Amount of tert-butyl chloride added (mmol) | Type of the inert medium | | Polymerization activity [g-pp/g-cat] | t-II [%] | MI [dg/min] | BD [g/ml] |
| EX. 34 | 0.5 | hexane | 2.7 | 13,700 | 97.5 | 3.3 | 0.45 |
| CEX. 18 | 0 | hexane | 2.8 | 10,900 | 97.5 | 2.6 | 0.45 |
| EX. 35 | 0.5 | hexane | 2.8 | 13,800 | 98.3 | 3.6 | 0.44 |
| CEX. 19 | 0 | hexane | 2.7 | 11,300 | 98.2 | 1.9 | 0.44 |

Examples 36–39

A titanium catalyst component (A) was prepared and preliminarily treated, and then propylene was polymerizing

TABLE 10

| | Catalyst synthesis | Conditions for preliminary contacting | | | | | | |
|---|---|---|---|---|---|---|---|---|
| Run No. | Electron donor added at the time of catalyst synthesis | Electron donor added at the time of preliminary treatment and polymerization | Amount of tert.-BuCl added (mmol) | Polymerization activity [g-pp/g-cat] | t-II [%] | MI [dg/min] | BD [g/ml] |
| EX. 36 | Diethyl 2-allylmalonate | Diphenyldimethoxysilane | 0.5 | 12,300 | 97.1 | 3.3 | 0.44 |
| CEX. 20 | " | " | 0 | 10,300 | 97.2 | 7.6 | 0.44 |
| EX. 37 | Di-n-hexyl phtalate | Di-n-propyldimethoxysilane | 0.5 | 12,300 | 97.8 | 4.9 | 0.44 |
| CEX. 21 | " | " | 0 | 10,700 | 97.8 | 5.2 | 0.44 |
| EX. 38 | Di-n-octyl cyclohexene-4.5-dicarboxylate | bis-Tolyldimethoxysilane | 0.5 | 12,200 | 97.7 | 5.5 | 0.44 |
| CEX. 22 | Di-n-octyl cyclohexene-4.5-dicarboxylate | " | 0 | 10,100 | 97.7 | 4.9 | 0.44 |
| EX. 39 | Di-isobutyl phthalate | tert-Butyltriethoxysilane | 0.5 | 10,900 | 97.6 | 3.4 | 0.44 |
| CEX. 23 | " | " | 0 | 9,600 | 97.5 | 3.4 | 0.44 |

Examples 40–42

The same preliminary treatment and the same polymerization of propylene as in Example 28 were carried out except that 0.5 mmol of tert-butyl chloride added at the time of preliminary treatment of the titanium catalyst component (A) in Example 28 was changed as shown in Table 11.

TABLE 11

| Run No. | Organic halogen compound name | Amount (mmol) | Polymerization activity [g-pp/g-cat] | t-II [%] | MI [dg/min] | BD [g/ml] |
|---|---|---|---|---|---|---|
| EX. 40 | sec-Butyl chloride | 1.0 | 13,700 | 98.6 | 3.1 | 0.43 |
| EX. 41 | sec-Butyl chloride | 3.0 | 13,200 | 98.2 | 3.4 | 0.44 |
| EX. 42 | 2-Chlorooctane | 3.0 | 12,700 | 98.3 | 5.1 | 0.43 |

Example 43

The same solid titanium catalyst component (A) as prepared in Example 1 was used.

Preliminary Treatment of a Titanium Catalyst Component (A):

A 400 ml four-necked glass reactor equipped with a stirrer was charged under a nitrogen atmosphere with 100 ml of purified hexane, 1.0 mmol of triethyl aluminum; 2 mmol of diphenyldimethoxysilane, 2.0 g of the solid titanium catalyst component (A) and 1 mmol of titanium tetrachloride. Then, at a temperature of 20° C., propylene was fed into the reactor for 1 hour at a rate of 3.2 Nl/hr. When the feeding of propylene ended, the inside of the reactor was purged with nitrogen, and the reaction product was subjected twice to a washing operation comprising removing the supernatant and adding purified hexane. The washed product was again suspended in purified hexane and all the suspension was transferred into a catalyst bottle. At this time, the entire volume and the concentration of the catalyst in the slurry were also measured.

Polymerization:

A 2-liter autoclave was charged with 750 ml of purified hexane, and at 60° C., 0.75 mmol of triethyl aluminum, 0.075 mmol of diphenyldimethoxysilane and 0.0075 mmol, calculated as titanium atom, of the preliminarily treated product of the catalyst component (A) [corresponding to 10.9 mg as the catalyst component (A)] were added in an atmosphere of propylene. Hydrogen (200 ml) was introduced, and the temperature was elevated to 70° C. Propylene was polymerized for 2 hours while maintaining the pressure during the polymerization at 7 kg/cm$^2$-G.

After the polymerization, the slurry containing the resulting polymer was filtered to separate it into a white powdery polymer and a liquid-phase portion. The amount of the white powdery polymer obtained after drying was 232.3 g. The polymer had a boiling n-heptane extraction residue of 98.5%, an MI of 5.1 and an apparent density of 0.44 g/ml. On the other hand, concentration of the liquid phase portion gave 1.3 g of a solvent-soluble polymer. Accordingly, the activity was 17,300 g-PP/g-catalyst, and II determined with respect to all polymers was 98.0%.

Comparative Example 24

The same preliminary treatment and the same polymerization as in Example 43 were carried out except that 1 mmol of titanium tetrachloride was not added at the time of the preliminary treatment of the titanium catalyst component (A) in Example 43. The results of the polymerization are shown in Table 12.

Examples 44–47

The same preliminary contacting and the same polymerization of propylene as in Example 43 were carried out except that the amount of TiCl$_4$ and the solvent used at the time of preliminary contacting were changed as shown in Table 12.

Example 48

The same preliminary contacting and the same polymerization of propylene as in Example 43 were carried out except that the feed rate of propylene and the time in the preliminary contacting in Example 43 were changed respectively to 8 Nl/hr and 4 hours. The results are shown in Table 12.

TABLE 12

| | Conditions for preliminary contacting | | | Results of the polymerization | | | |
|---|---|---|---|---|---|---|---|
| Run No. | Amount of the transition metal compound (mmol) | Type of the inert medium | Amount of -olefin polymerized preliminary [g-pp/g-cat] | Polymerization activity [g-pp/g-cat] | t-II [%] | MI [dg/min] | BD [g/ml] |
| EX. 43 | 1 | hexane | 2.8 | 17,300 | 98.0 | 5.1 | 0.44 |
| CEX. 24 | 0 | hexane | 2.7 | 11,600 | 98.5 | 4.0 | 0.44 |
| EX. 44 | 1.5 | hexane | 2.8 | 15,700 | 97.7 | 7.4 | 0.44 |
| EX. 45 | 0.7 | hexane | 2.8 | 15,400 | 98.1 | 5.3 | 0.44 |
| EX. 46 | 1 | toluene | 2.8 | 16,200 | 98.0 | 6.1 | 0.44 |
| EX. 47 | 1 | isodecane | 3.0 | 17,200 | 98.0 | 6.9 | 0.44 |
| EX. 48 | 1 | hexane | 2.8 | 16,800 | 98.2 | 5.5 | 0.45 |

Example 49

The same solid titanium catalyst component (A) as prepared in Example 6 was preliminarily treated, and propylene was polymerized, as in Example 43. The results are shown in Table 13.

Comparative Example 25

The same preliminary treatment and the same polymerization as in Example 49 were carried out except that 1 mmol of titanium tetrachloride was not added at the time of preliminary treating the titanium catalyst component (A) in Example 49. The results of the polymerizing merization are shown in Table 13.

Example 50

The same preliminary treatment and the same polymerization of propylene as in Example 43 were carried out except that the same solid titanium catalyst component (A) as prepared in Example 7 was used. The results are shown in Table 13.

Comparative Example 26

The same preliminary treatment and the same polymerization as in Example 50 were carried out except that 1 mmol of titanium tetrachloride was not added at the time of preliminary treatment of the titanium catalyst component (A).

Examples 51–54

A titanium catalyst component (A) was prepared and preliminarily treated, and propylene was polymerized, in the same way as in Example 49 except that in Example 49, each of the electron donors indicated in Table 14 was used instead of di-n-octyl cyclohexanedicarboxylate used in the preparation of the titanium catalyst component (A) and each of the electron donors indicated in Table 14 was used instead of diphenyldimethoxysilane used in the preliminary treatment of the titanium catalyst component (a) and in the polymerization of propylene. The results are shown in Table 14.

Comparative Examples 27–30

The same preliminary treatment and the same polymerization of propylene as in Examples 51 to 54 were carried out except that $TiCl_4$ was not added at the time of preliminary treatment of the titanium catalyst component (A) in Examples 51 to 54. The results are shown in Table 14.

TABLE 13

| | Conditions for preliminary contacting | | | Results of the polymerization | | | |
|---|---|---|---|---|---|---|---|
| Run No. | Amount of the transition metal compound (mmol) | Type of the inert medium | Amount of -olefin polymerized preliminary [g-pp/g-cat] | Polymerization activity [g-pp/g-cat] | t-II [%] | MI [dg/min] | BD [g/ml] |
| EX. 49 | 1 | hexane | 2.8 | 16,300 | 97.2 | 7.2 | 0.45 |
| CEX. 25 | 0 | hexane | 2.8 | 10,900 | 97.5 | 2.6 | 0.45 |
| EX. 50 | 1 | hexane | 2.9 | 17,000 | 97.9 | 6.5 | 0.44 |
| CEX. 26 | 0 | hexane | 2.7 | 11,300 | 98.2 | 1.9 | 0.44 |

TABLE 14

| | Catalyst synthesis | Conditions for preliminary contacting | | Results of the polymerization | | | |
|---|---|---|---|---|---|---|---|
| Run No. | Electron donor added at the time of catalyst synthesis | Electron donor added at the time of preliminary treatment and polymerization | $TiCl_4$ added (mmol) | Polymerization activity [g-pp/g-cat] | t-II [%] | MI [dg/min] | BD [g/ml] |
| EX. 51 | Diethyl 2-allylmalonate | Diphenyldimethoxysilane | 1 | 13,900 | 97.0 | 10.3 | 0.44 |
| CEX. 27 | " | " | 0 | 10,300 | 97.2 | 7.6 | 0.44 |
| EX. 52 | Di-n-hexyl phtalate | Di-n-propyldimethoxysilane | 1 | 14,000 | 97.5 | 8.6 | 0.44 |
| CEX. 28 | " | " | 0 | 10,700 | 97.8 | 5.2 | 0.44 |
| EX. 53 | Di-n-octyl cyclohexene-4.5-dicarboxylate | bis-Tolyldimethoxysilane | 1 | 13,200 | 97.4 | 7.6 | 0.44 |
| CEX. 29 | Di-n-octyl cyclohexene-4.5-dicarboxylate | " | 0 | 10,100 | 97.7 | 4.9 | 0.44 |
| EX. 54 | Di-isobutyl phthalate | tert-Butyltriethoxysilane | 1 | 12,100 | 97.2 | 6.2 | 0.44 |
| CEX. 30 | " | " | 0 | 9,600 | 97.5 | 3.4 | 0.44 |

What is claimed is:

1. A process for polymerizing propylene or copolymerizing at least 70 mole % propylene with another alpha-olefin which comprises preliminarily polymerizing propylene in the presence of (A') a highly active solid titanium catalyst component containing magnesium, titanium and halogen atoms, (B) an organoaluminum compound, and (C) a catalyst component consisting of branched chain alkyl chlorides having up to 20 carbon atoms or titanium tetrachloride, wherein the components (A'), (B) and (C) are contacted in the presence or absence of propylene, prior to the preliminary polymerization; and polymerizing propylene or copolymerizing at least 70 mole % propylene with another alpha-olefin in the presence of the resulting catalyst formed in the preliminary polymerization;

wherein said preliminary polymerization is carried out in suspension with an inert hydrocarbon medium by polymerizing 1 to 100 g of propylene, per 1 g of the component (A'), and the preliminarily polymerized catalyst in suspension is separated from the suspension; and wherein, in the case when the catalyst component (C) is titanium tetrachloride, the proportion of the transition atom in the component (C) is 0.1 to 10 gram·atom per gram·atom of titanium in the component (A').

2. The process of claim 1 in which the highly active solid titanium catalyst component (A') has a surface area of at least 3 $m^2/g$.

3. The process of claim 1 in which the halogen/titanium atomic ratio of the highly active solid titanium catalyst component (A') is from 5 to 200.

4. The process of claim 1 in which the highly active solid titanium catalyst component (A') further comprises an electron donor, and the mole ratio of the electron donor to titanium is from 0.1 to 10.

5. The process of claim 1 in which the magnesium/titanium atomic ratio of the highly active solid titanium catalyst component (A') is from 2 to 100.

6. The process of claim 1 in which the catalyst component (C) is titanium tetrachloride.

7. The process of claim 1 in which the catalyst further comprises an organosilicon compound catalyst component (D) which is a silane, a siloxane or a silyl ester of a carboxylic acid.

8. The process of claim 1 in which the catalyst components (A'), (B) and (C) and optionally a component (D) which is an organosilicon compound are contacted at a temperature of −50 to 100° C. in an inert medium.

9. The process of claim 1 in which the alpha-olefin is ethylene or has 4 to 10 carbon atoms.

10. The process of claim 1 wherein the step of preliminary polymerization in the presence of a catalyst formed from (A'), (B), and (C), is carried out at a temperature of from 0 to 50° C. for from 1 to 10 hours.

11. The process of claim 1, wherein the preliminary polymerization is carried out at a temperature of from about −20 to 70° C. for a period of from about 0.5 to 20 hours in an inert medium, and the concentration of solid catalysts, as the concentration of the transition metal atom in the solid catalyst, is from about $10^{-6}$ to 1 g-atom/liter.

12. The process of claim 11, wherein the polymerization or copolymerization in the presence of the said resulting catalyst from the preliminary polymerization is carried out at a temperature of from about 20 to 200° C. at a pressure of from about atmospheric to 100 $kg/cm^2$, and the proportion of the catalyst component (A') calculated as Ti atom, is from about 0.001 to 0.5 mg-atom/liter, the proportion of the catalyst component (B) is such that the metal atom in component (B) is from about 1 to 2,000 g-atom per g-atom of the titanium atom in the catalyst component (A').

13. The process of claim 1, wherein the branched chain alkyl chloride is t-butyl chloride, sec-butyl chloride or 2-chlorooctane.

* * * * *